US011429510B2

(12) United States Patent
Kadel et al.

(10) Patent No.: US 11,429,510 B2
(45) Date of Patent: Aug. 30, 2022

(54) ELECTRONIC APPARATUS FOR VERIFYING CODE AND METHOD THEREOF

(71) Applicant: Coupang Corp., Seoul (KR)

(72) Inventors: Prakash Kadel, Seoul (KR); Dae Hwan Bae, Seoul (KR); Tae Il Kim, Seoul (KR); Ki Woong Jang, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/153,319

(22) Filed: Jan. 20, 2021

(65) Prior Publication Data

US 2022/0197774 A1 Jun. 23, 2022

(30) Foreign Application Priority Data

Dec. 21, 2020 (KR) .......................... 10-2020-0180048

(51) Int. Cl.
*G06F 11/36* (2006.01)
*G06F 8/60* (2018.01)

(52) U.S. Cl.
CPC ............ *G06F 11/3604* (2013.01); *G06F 8/60* (2013.01); *G06F 11/3664* (2013.01)

(58) Field of Classification Search
CPC ..... G06F 11/3604; G06F 11/3664; G06F 8/60
See application file for complete search history.

(56) References Cited

U.S. PATENT DOCUMENTS

| 8,001,422 | B1 * | 8/2011 | Sun ........................ G06F 11/263 714/25 |
| 9,672,137 | B1 * | 6/2017 | Allocca ............... G06F 11/3461 |
| 10,884,903 | B1 * | 1/2021 | Barua ................. G06F 11/3608 |
| 2008/0178047 | A1 | 7/2008 | Bae et al. |

(Continued)

FOREIGN PATENT DOCUMENTS

| CN | 104951399 | 9/2015 |
| CN | 110489966 | 11/2019 |

(Continued)

OTHER PUBLICATIONS

Hong Mei et al., "A framework for testing Web services and its supporting tool," 2005 [retrieved on Apr. 20, 2022], IEEE International Workshop on Service-Oriented System Engineering, pp. 1-8, downloaded from <url>:https://ieeexplore.ieee.org. (Year: 2005).*

*Primary Examiner* — S. Sough
*Assistant Examiner* — Stephen D Berman
(74) *Attorney, Agent, or Firm* — Knobbe, Martens, Olson & Bear, LLP

(57) ABSTRACT

An information providing method is provided, the method including acquiring a request information set by an electronic apparatus, transmitting a request information sub-set corresponding to at least a portion of the request information set to a reference server, transmitting the request information sub-set to a development server, receiving a first response set including a first response to the request information sub-set from the reference server, receiving a second response set including a second response to the request information sub-set from the development server, and providing comparison information of the first response set and the second response set.

18 Claims, 7 Drawing Sheets

(56) References Cited

U.S. PATENT DOCUMENTS

| | | | |
|---|---|---|---|
| 2016/0283348 A1* | 9/2016 | Golde | G06F 8/70 |
| 2017/0255542 A1* | 9/2017 | Potti | G06F 8/60 |
| 2018/0004640 A1* | 1/2018 | Shavro | G06F 11/3664 |
| 2018/0314625 A1* | 11/2018 | Schuller | G06F 11/3414 |
| 2020/0348921 A1* | 11/2020 | Marechal | G06F 11/3688 |
| 2021/0232369 A1 | 7/2021 | Sharma et al. | |

FOREIGN PATENT DOCUMENTS

| | | |
|---|---|---|
| EP | 2095237 A2 | 9/2009 |
| EP | 2076863 B1 | 5/2018 |
| JP | 2008-176793 A | 7/2008 |
| JP | 2009-245353 A | 10/2009 |
| JP | 2013-529321 A | 7/2013 |
| JP | 2015-225361 A | 12/2015 |
| JP | 2019-086804 A | 6/2019 |
| KR | 10-2004-0050463 A | 6/2004 |
| KR | 10-2008-0068385 A | 7/2008 |
| KR | 10-2010-0100161 A | 9/2010 |
| KR | 10-1046137 B1 | 7/2011 |
| KR | 10-1440646 B1 | 9/2014 |
| KR | 10-1581702 B1 | 1/2016 |
| KR | 10-1748378 B | 6/2017 |
| KR | 10-2092722 B1 | 4/2020 |
| WO | WO 2012-087330 A2 | 6/2012 |
| WO | WO 18/160199 | 9/2018 |

\* cited by examiner

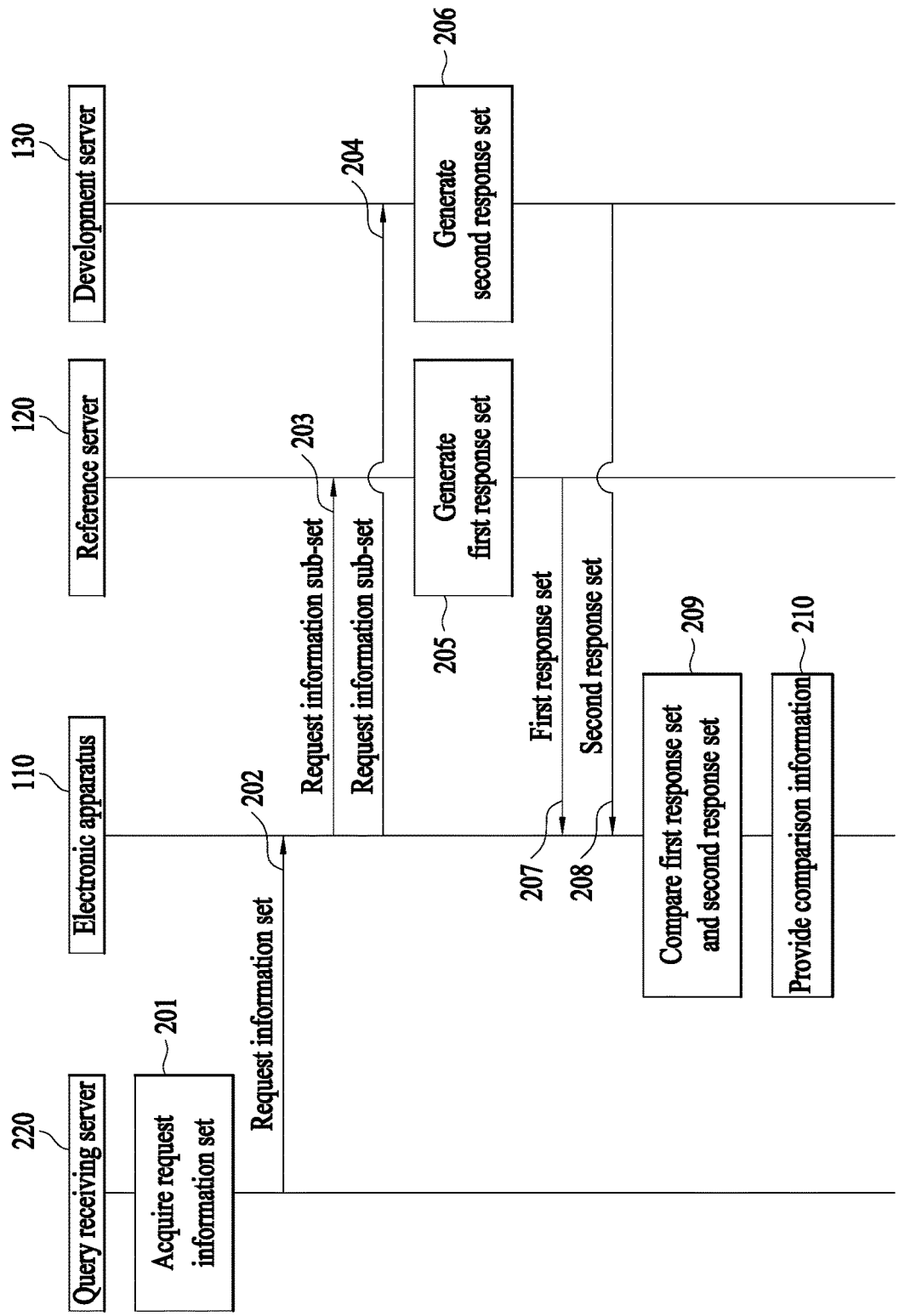

ELECTRONIC APPARATUS FOR VERIFYING CODE AND METHOD THEREOF

BACKGROUND

Technical Field

The present disclosure relates to an electronic apparatus for verifying a code and a method thereof. More particularly, the present disclosure relates to an electronic apparatus that samples a user input, transmits the sampled user input to a server in which codes of different versions are executed, and provides information on or regarding a comparison of result values, thereby verifying a code, and a method thereof.

Description of the Related Art

With developments of electronic technologies, services using electronic technologies have been settled in our daily lives. A server providing a service to a user may need to change a code (e.g., a program that is described by machine language and interpreted by a central processing unit (CPU) for execution) for its operation for reasons such as fixing an error or providing an additional function.

Conventionally, in an information processing device such as a server, a personal computer, or a mobile communication device, it has been required to execute a verified code on the device. In other words, it is necessary to prevent a code that is unintentionally changed by a third party or a code that is likely to cause an unexpected error from being stored in a memory and executed on the device.

In related arts for such a necessity, a method of adding verification software in an information processing device and verifying a code before execution using verification information given to the code, or a method of adding demodulation software in an information processing device and demodulating an encoded code before execution, thereby verifying the code has been practiced in general.

However, in the related arts, since the code is verified by software, there may be a possibility of a software operation error and a limitation that separate software must be added in the information processing device.

Accordingly, there is a desire for a method and apparatus for verifying a code without needing to change a structure of a processor or a memory of an information processing device or install separate software.

SUMMARY

Technical Goals

An aspect provides an electronic apparatus that verifies a code in a test environment and preemptively determines whether the code is erroneous, thereby preventing an occurrence of an error when providing a service to a user using the code, and a method thereof.

Technical goals to be achieved through the example embodiments are not limited to the technical goals as described above, and other technical tasks can be inferred from the following example embodiments.

Technical Solutions

According to an aspect, there is provided a method of providing information in an electronic apparatus, the method including acquiring a request information set, transmitting a request information sub-set corresponding to at least a portion of the request information set to a reference server, transmitting the request information sub-set to a development server, receiving a first response set including a response to the request information sub-set from the reference server, receiving a second response set including a response to the request information sub-set from the development server, and providing comparison information of the first response set and the second response set.

The request information set may be acquired based on user information input to a service server corresponding to the reference server.

The development server may have a structure corresponding to a structure of the reference server. A code of the development server for generating the response to the request information sub-set may be associated with a code of the reference server. The code of the development server may be changed based on a user input.

The providing of the comparison information may include providing information on or regarding a comparison between the first response set and the second response set for each of one or more application programming interfaces (APIs) associated with processing of the request information sub-set.

When the request information set is acquired on a time-by-time basis, the providing of the comparison information may include outputting time information on or regarding a result of comparison between the first response set and the second response set.

The method may further include outputting statistics information associated with the development server and the reference server.

The statistics information may include performance information associated with generating a response to the request information sub-set by at least one of the reference server and the development server.

The performance information may include performance information of an application installed in at least one of the reference server and the development server. The performance information of the application may include at least one of a memory usage and a latency related to generating of the response.

The statistics information may be output for each of one or more APIs associated with processing of the request information sub-set.

The method may further include determining whether the code of the development server is abnormal based on a result of comparison between the first response set and the second response set.

The method may further include deploying, when the code of the development server is determined to be normal, the code of the development server to a service server corresponding to the reference server.

The electronic apparatus may include at least one sub-apparatus. The providing of the comparison information may be performed by the at least one sub-apparatus.

According to another aspect, there is also provided an electronic apparatus for providing information, the electronic apparatus including a transceiver, a memory including instructions, and a processor, wherein the processor is connected to the memory to acquire a request information set, transmit a request information sub-set corresponding to at least a portion of the request information set to a reference server, transmit the request information sub-set to a development server, receive a first response set including a response to the request information sub-set from the reference server, receive a second response set including a response to the request information sub-set from the development server, and provide comparison information of the first response set and the second response set.

Details of example embodiments are included in the detailed description and drawings.

Effects

According to the present disclosure, an electronic apparatus for verifying a code and a method thereof may verify a code in a test environment and preemptively determine whether the code is erroneous, thereby preventing an occurrence of an error when providing a service to a user using the code.

Effects are not limited to the aforementioned effects, and other effects not mentioned will be clearly understood by those skilled in the art from the description of the claims.

BRIEF DESCRIPTION OF THE DRAWINGS

FIG. 2 is a flowchart illustrating a method of providing information in an information providing system according to an example embodiment.

DETAILED DESCRIPTION

Figure 1:
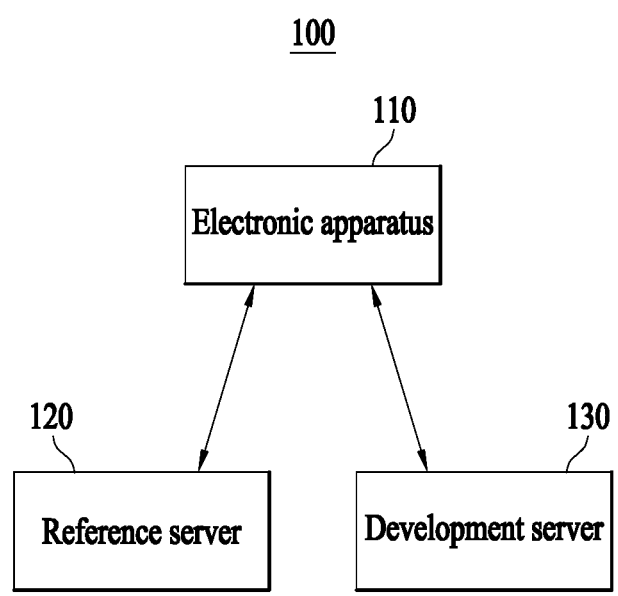
FIG. 1 is a block diagram illustrating an information providing system according to an example embodiment.

The terms used in the embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

The expression "at least one of A, B, and C" may include the following meanings: A alone; B alone; C alone; both A and B together; both A and C together; both B and C together; and all three of A, B, and C together.

In the present disclosure, a "terminal" may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, example embodiments of the present disclosure will be described in detail with reference to the drawings so that those skilled in the art can easily carry out the present disclosure. The present disclosure may be embodied in many different forms and is not limited to the embodiments described herein.

Hereinafter, example embodiments of the present disclosure will be described with reference to the drawings.

In describing the example embodiments, descriptions of technical contents that are well known in the art to which the present disclosure belongs and are not directly related to the present specification will be omitted. This is to more clearly communicate without obscure the subject matter of the present specification by omitting unnecessary description.

For the same reason, in the accompanying drawings, some components are exaggerated, omitted or schematically illustrated. In addition, the size of each component does not fully reflect the actual size. The same or corresponding components in each drawing are given the same reference numerals.

Advantages and features of the present disclosure and methods of achieving them will be apparent from the following example embodiments that will be described in more detail with reference to the accompanying drawings. It should be noted, however, that the present disclosure is not limited to the following example embodiments, and may be implemented in various forms. Accordingly, the example embodiments are provided only to disclose the present disclosure and let those skilled in the art know the category of the present disclosure. In the drawings, embodiments of the present disclosure are not limited to the specific examples provided herein and are exaggerated for clarity. The same reference numerals or the same reference designators denote the same elements throughout the specification.

At this point, it will be understood that each block of the flowchart illustrations and combinations of flowchart illustrations may be performed by computer program instructions. Since these computer program instructions may be mounted on a processor of a general purpose computer, special purpose computer, or other programmable data processing equipment, those instructions executed through the computer or the processor of other programmable data processing equipment may create a means to perform the functions be described in flowchart block(s). These computer program instructions may be stored in a computer usable or computer readable memory that can be directed to a computer or other programmable data processing equipment to implement functionality in a particular manner, and thus the computer usable or computer readable memory. It is also possible for the instructions stored in to produce an article of manufacture containing instruction means for performing the functions described in the flowchart block(s). Computer program instructions may also be mounted on a computer or other programmable data processing equipment, such that a series of operating steps may be performed on the computer or other programmable data processing equipment to create a computer-implemented process to create a computer or other programmable data. Instructions for performing the processing equipment may also provide steps for performing the functions described in the flowchart block(s).

In addition, each block may represent a portion of a module, segment, or code that includes one or more executable instructions for executing a specified logical function(s). It should also be noted that in some alternative implementations, the functions noted in the blocks may occur out of order. For example, the two blocks shown in succession may in fact be executed substantially concurrently, or the blocks may sometimes be executed in the reverse order, depending on the corresponding function.

FIG. 1 is a block diagram illustrating an information providing system according to an example embodiment.

According to various example embodiments, an information providing system may include an electronic apparatus 110, a reference server 120, and a development server 130. In some embodiments, the information providing system may further include a network (not shown) supporting information transmission and reception performed among the electronic apparatus 110, the reference server 120, and the development server 130.

Each of the electronic apparatus 110, the reference server 120, and the development server 130 may include a memory and a processor. In addition, each of the electronic apparatus 110, the reference server 120, and the development server 130 may refer to a component that exerts at least one function or operation, and may be implemented through hardware or software, or a combination of hardware and software.

According to an example embodiment, the electronic apparatus 110, the reference server 120, and the development server 130 may include computer software or a plurality of computer systems implemented as a network server and may provide various information by configuring the information into a web page. For example, at least some of the electronic apparatus 110, the reference server 120, and the development server 130 may refer to computer software and a computer system connected to a sub-device that communicates with another network server through a computer network such as an intranet or the Internet to receive a request to perform a task, perform the task, and provide a result of the task. In addition, the electronic apparatus 110, the reference server 120, and the development server 130 may be understood as broad concepts including a series of application programs that operate on a network server and various databases built therein. For example, at least some of the electronic apparatus 110, the reference server 120, and the development server 130 may be implemented using a network server program that is provided in various ways based on an operating system such as DOS, Windows, Linux, UNIX, Mac OS, or the like.

To provide information, the electronic apparatus 110 acquires a request information set, transmits a request information sub-set corresponding to at least a portion of the request information set to the reference server 120, transmits the request information sub-set to the development server 130, receives a first response set including a response to the request information sub-set from the reference server 120, and receives a second response set including a response to the request information sub-set from the development server 130. A network may be used for communication between the electronic apparatus 110 and the reference server 120 and communication between the electronic apparatus 110 and the development server 130. In addition, in the example embodiment, the electronic apparatus 110 may generate comparison information based on information received from the reference server 120 and information received from the development server 130. Also, the electronic apparatus 110 may receive information associated with an execution state in the development server 130 for a response based on the information corresponding to the request information sub-set received from the development server 130 and provide the received information.

According to an example embodiment, the electronic apparatus 110 may include a stateful server. Specifically, the electronic apparatus 110 may track a state of communication with another device connected to the electronic apparatus 110 in real time and use the state of communication to provide information of the electronic apparatus 110. For example, the electronic apparatus 110 may acquire performance information including a latency related to data transmission and reception. The latency may include at least one of a period of time required for generating a response in each server and a period of time for transmitting corresponding information on or associated with the network. In addition, in the example embodiment, the performance information may include information associated with resources used by another device to generate a response to request information. For example, information such as a memory usage and a central processing unit (CPU) usage may also be included in the performance information. Based on the performance information, a situation in which a code is operated in the corresponding server may be monitored with increased efficiency. Also, in the example embodiment, the performance information may include performance information of an application installed in another electronic apparatus. For example, the application may generate response information based on request information. As such, references related to performance used by the application to generate the response information may be included in the performance information.

A method to provide information by the electronic apparatus 110 will be described in greater detail with reference to FIGS. 2 through 5.

The reference server 120 receives the request information sub-set from the electronic apparatus 110, generates a response to the request information sub-set (hereinafter, referred to as a "first response set"), and transmits the generated first response set to the electronic apparatus 110. The reference server 120 is a server corresponding to a service server that provides a service to a user in practice, and may be a server having a structure corresponding to that of the service server. A code used in the reference server 120 to generate a response to the request information sub-set may correspond to a code used in the service server to generate a response to the request information sub-set.

The development server 130 receives the request information sub-set from the electronic apparatus 110, generates a response to the request information sub-set (hereinafter, referred to as a "second response set"), and transmits the generated second response set to the electronic apparatus 110. The development server 130 is a server corresponding to the service server that provides the service to the user in practice and may be a server having a structure corresponding to that of the service server. That is, the development server 130 and the reference server 120 may have structures corresponding to each other.

A code used in the development server 130 to generate a response to the request information sub-set may be a code associated with the code used in the service server to generate the response to the request information sub-set. The code of the development server 130 may be changed based on a user input.

The reference server 120 may use the code used in the service server, and the development server 130 may use a changed code. Through this, the second response set may correspond to a response of a case in which the changed code is used, and the first response set may correspond to a response of a case in which an existing code is used. In this instance, whether the changed code is erroneous may be determined by comparing the first response set and the second response set. Meanwhile, in the example embodiment, the reference server 120 may also be implemented as at least some servers among at least one server used in an actual service.

For brevity, the following description is based on a case in which the development server 130 uses the changed code. However, embodiments of the present disclosure are not limited to the case in which the development server 130 uses the changed code. In some embodiments, the development server 130 may use the same code as the reference server 120. For example, if the reference server 120 and the development server 130 use the same code, whether the structures of the reference server 120 and the development server 130 correspond to each other may be verified.

The network may serve to connect the electronic apparatus 110 to the reference server 120, the electronic apparatus 110 to the development server 130, or the electronic apparatus 110 to an external device (e.g., a query server, a service server, etc.). For example, the network may provide a connection path such that the reference server 120, the development server 130, or the external device is connected to the electronic apparatus 110 to transmit and receive packet data to and from the electronic apparatus 110.

Operations related to an information providing method according to various example embodiments may be implemented by a single physical device or may be implemented by a plurality of physical devices combined organically. For example, some of the components included in the information providing system may be implemented as one physical device, and other components included in the information providing system may be implemented as another physical device. For example, one physical device may be implemented as a part of the electronic apparatus 110, and another physical device may be implemented as a part of the reference server 120 or a part of the development server 130 or a part of an external device. In some cases, components included in the information providing system may be distributed and arranged in different physical devices. The distributed components may be organically combined to perform functions and operations of the information providing system. For example, the electronic apparatus 110 of the present disclosure includes at least one sub-apparatus. Some operations described as being performed by the electronic apparatus 110 may be performed by a first sub-apparatus, and some other operations may be performed by a second sub-apparatus. For example, an operation of providing comparison information of a first response set and a second response set may be performed by a sub-apparatus included in the electronic apparatus 110.

FIG. 2 is a flowchart illustrating a method of providing information in an information providing system according to an example embodiment.

Referring to FIG. 2, a query receiving server 220 acquires a request information set in operation 201 and transfers the acquired request information set to the electronic apparatus 110 in operation 202. The query receiving server 220 may include a server that transmits received information to another device. For example, the query receiving server 220 may use a distributed messaging system to transmit received information to another node. The distributed messaging system may be, for example, Apache Kafka.

The query receiving server 220 may acquire the request information set from a service server that provides a service to a user in practice. The request information set may be information acquired based on user information input to the service server. The request information set may be a set of various information input by the user receiving the service. For example, the request information set may include request information transmitted to a back end server based on a user input that is input to a front end server.

In some embodiments, the electronic apparatus 110 may receive the request information set directly from the service server not through the query receiving server 220 or the query receiving server 220 may be implemented as a part of the electronic apparatus 110.

The electronic apparatus 110 may acquire a request information sub-set based on the received request information set. The request information sub-set may correspond to at least a portion of the request information set. For example, the request information sub-set may be generated by sampling a plurality of user information included in the request information set at a predetermined proportion. Meanwhile, a sampling proportion may vary based on a setting of the electronic apparatus 110. In addition, a number of the request information sub-set acquired per unit time may also vary based on the setting of the electronic apparatus 110. By adjusting the sampling proportion or the number of the request information sub-sets sampled per unit time, a load test of the development server 130 may be easily performed.

In operation 203, the electronic apparatus 110 may transmit the request information sub-set to the reference server 120. In operation 204, the electronic apparatus 110 may transmit the request information sub-set to the development server 130. In operation 205, the reference server 120 may generate a first response set including a response to the received request information sub-set. In operation 207, the reference server 120 may transmit the generated first response set to the electronic apparatus 110. In operation 206, the development server 130 may generate a second response set including a response to the received request information sub-set. In operation 208, the development server 130 may transmit the generated second response set to the electronic apparatus 110.

The electronic apparatus 110 may compare the received first response set and the second response set in operation 209 and provide comparison information in operation 210. Specifically, the electronic apparatus 110 may compare a plurality of responses included in the first response set and a plurality of responses included in the second response set and compare certain portions of responses of corresponding codes, thereby verifying whether the same response is received or different responses are received. In the example embodiment, through the setting for the electronic apparatus 110, portions to be compared among the responses for specific codes may be set. In addition, a user interface (UI) for identifying a different portion through a comparison between two responses may also be provided. Also, the electronic apparatus 110 may provide information on a proportion of responses having different outputs among the entire responses. An example related to a comparison result will be described in greater detail with reference to FIG. 4.

According to an example embodiment, the electronic apparatus 110 may compare the first response set and the second response set via each of one or more application programming interfaces (APIs) associated with processing of the request information sub-set. In this case, the electronic apparatus 110 may provide information on a comparison between the first response set and the second response set so as to be separated via each of the one or more APIs.

A manager may determine whether a changed code used by the development server 130 is erroneous based on the comparison information provided from the electronic apparatus 110. Specifically, the manager may determine a degree to which the plurality of responses included in the first response set matches the plurality of responses included in the second response set. When an unexpected nonmatching response is found (for example, when it does not correspond to the nonmatching intended at the time of the code change), the manager may determine that the changed code is erroneous and correct the changed code. When the electronic apparatus 110 provides the information on the comparison between the first response set and the second response set so as to be separated for each of the one or more APIs, the manager may quickly identify an API in which the nonmatching response is generated and thus, may easily find an erroneous portion of the changed code.

When an unexpected nonmatching response is not found, the manager may deploy the code used by the development server 130 to the service server corresponding to the reference server 120.

According to an example embodiment, when the request information set is acquired on a time-by-time basis, the electronic apparatus 110 may provide time information associated with a comparison result of the first response set and the second response set. For example, the electronic apparatus 110 may provide a comparison result of the first response set and the second response set in a form of a graph using a time series as an axis.

An example of the electronic apparatus 110 providing the comparison information of the first response set and the second response set is described in greater detail with reference to FIG. 4.

The electronic apparatus 110 may further provide statistics information associated with the reference server 120 and the development server 130. At least a portion of the statistics information provided by the electronic apparatus 110 may correspond to the comparison information of the first response set and the second response set. The statistics information provided by the electronic apparatus 110 may include the number of user inputs included in the request information sub-set. In addition, the statistics information provided by the electronic apparatus 110 may include performance information of the electronic apparatus 110. For example, the statistics information may include a latency related to at least some of acquisition of request information, transmission of the request information sub-set, and reception of the first response set and the second response set.

According to an example embodiment, the electronic apparatus 110 may provide the statistics information for each of the one or more APIs associated with the processing of the request information sub-set. For example, the electronic apparatus 110 may provide, for each of the one or more APIs, the number of user inputs included in the request information sub-set, and the total number of user inputs included in the request information sub-set.

According to an example embodiment, the electronic apparatus 110 may provide the time information along with the statistics information. For example, the electronic apparatus 110 may provide the user with the number of user inputs included in the request information sub-set or the performance information (e.g., latency) in a form of a graph having a time series as an axis.

An example of the electronic apparatus 110 providing the statistics information associated with the reference server 120 and the development server 130 is described in greater detail with reference to FIGS. 3A and 3B.

According to an example embodiment, the electronic apparatus 110 may determine whether a code of the development server 130 is erroneous based on a result of the comparison between the first response set and the second response set. In this case, the electronic apparatus 110 may determine whether the code is erroneous based on a condition set in advance. For example, as a result of the comparison between the first response set and the second response set, when a nonmatching response occurrence ratio exceeds a predetermined threshold ratio, the electronic apparatus 110 may determine that the code of the development server 130 is erroneous. In this example, nonmatching responses corresponding to a result intended at the time that the code used in the development server 130 is changed may be regarded as being not a nonmatching response in determining whether the code of the development server 130 is erroneous. For example, when the code used in the development server 130 is a code changed to output a changed result for a specific API, the corresponding API may be excluded in determining the nonmatching response occurrence ratio.

According to an example embodiment, the electronic apparatus 110 may deploy the code used by the development server 130 to the service server corresponding to the reference server 120. In this case, the electronic apparatus 110 may autonomously determine whether the code is erroneous, or the manager may determine whether the code is erroneous and input a determination result to the electronic apparatus 110.

Figure 3A:
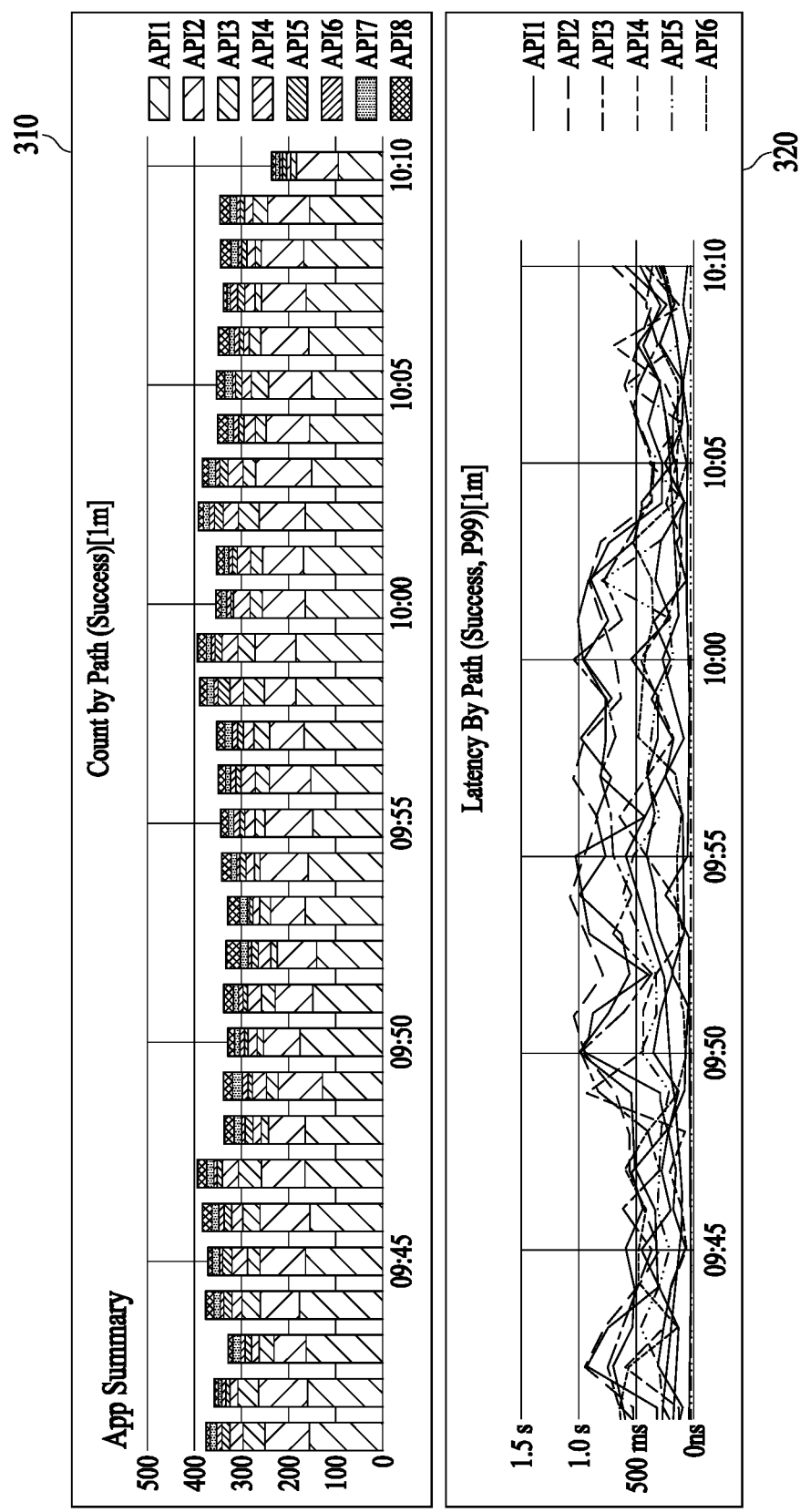
FIG. 3A is a diagram illustrating an example of statistics information provided by an electronic apparatus according to an example embodiment.
Figure 3B:
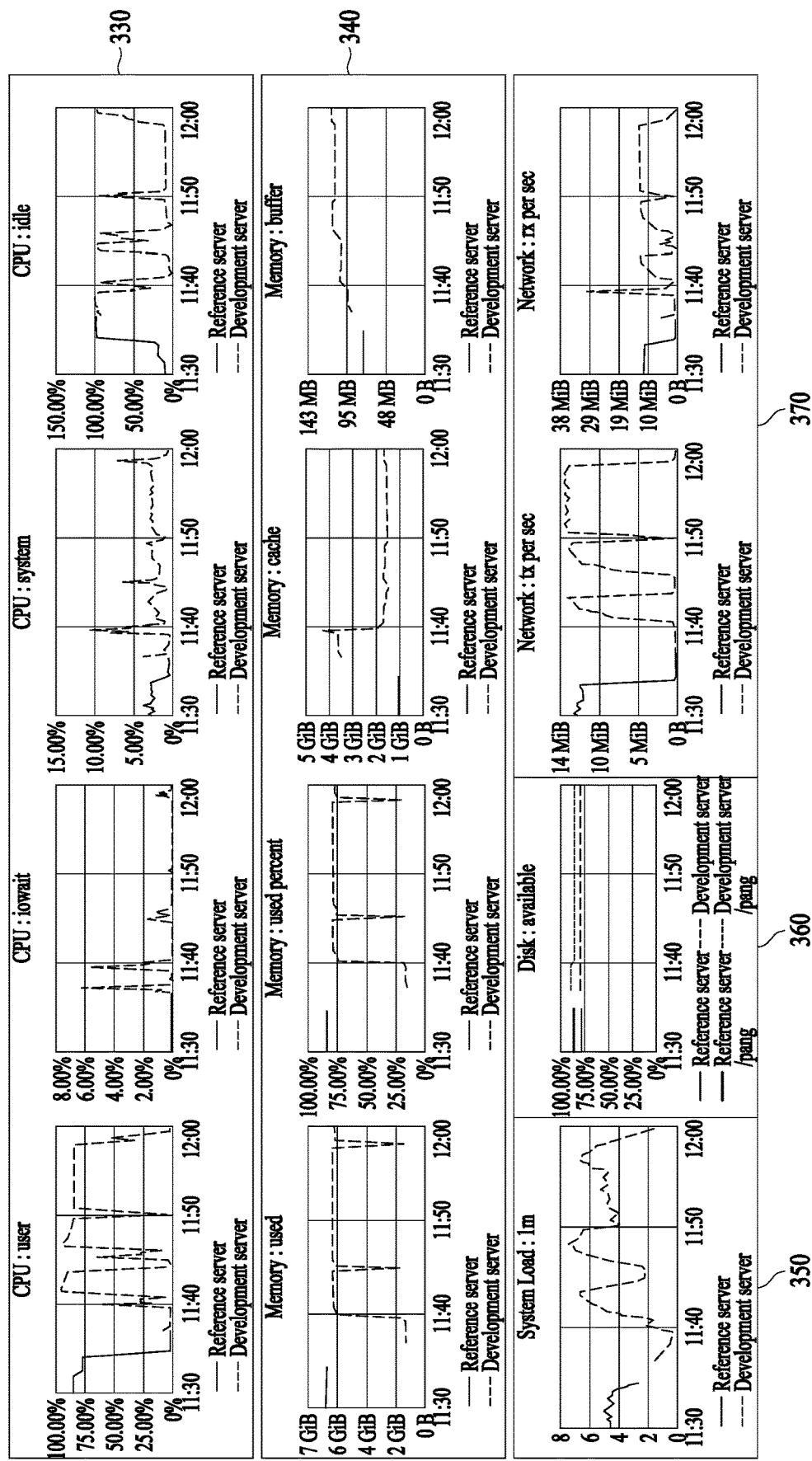
FIG. 3B is a diagram illustrating an example of statistics information provided by an electronic apparatus according to an example embodiment.

FIGS. 3A and 3B are diagrams illustrating examples of statistics information provided by an electronic apparatus according to an example embodiment.

Referring to FIGS. 3A and 3B, the electronic apparatus 110 may provide statistics information associated with the reference server 120 and the development server 130. The statistics information provided by the electronic apparatus 110 may include a number of user inputs 310 included in a request information sub-set and performance information 320 through 370. At least a portion of the performance information 320 through 370 may be associated with an operation of the electronic apparatus 110, and at least another portion may be associated with generating a response to the request information sub-set by at least one of the reference server 120 and the development server 130. For example, the performance information 320 through 370 included in the statistics information may include at least one information indicating performance of at least one the electronic apparatus 110, the reference server 120, and the development server 130 in relation to at least some of acquisition of request information, transmission of the request information sub-set, and reception of a first response set and a second response set.

The performance information 320 through 370 may include performance information of an application installed in at least one of the reference server 120 and the development server 130. Performance information of an application may include at least one of a memory usage and a latency related to generating at least a portion of a plurality of responses included in the first response set and a plurality of responses included in the second response set. According to an example embodiment, the performance information of the application may include CPU performance-related information 330, memory performance-related information 340, system load information 350 of the electronic apparatus 110, available disk capacity information 360, and information 370 associated with data throughput of a network per unit time. In this case, the CPU performance-related information 330 may include "CPU: user" which is a CPU use time in a user area, "CPU: iowait" which is a CPU time used to temporarily hold a CPU task due to other communications, "CPU: system" which is a CPU use time in a system area, and "CPU: idle" which is a proportion of an idle state in which the CPU is not used. In addition, the memory performance-related information may include "Memory: used" and "Memory: used percent" which are information associated with a memory usage, "Memory: cache" which is cache information associated with a memory, and "Memory: buffer" which is buffer information associated with the memory.

The statistics information may be displayed in a form of a graph having a time series as a horizontal axis. At least a portion of the statistics information may be displayed to be separated for each of the one or more APIs. By tine-sequentially displaying the statistics information, the manager may determine whether an error has occurred at a predetermined point in time in relation to an input and an output of information. For example, when the number of user inputs is significantly small, or when the latency is excessively long at a predetermined point in time, the manager may determine that information transmitted and received at the point in time has a low reliability. Also, when the number of user inputs is significantly small, or when the latency is excessively long at a point in time close to a current point in time, the manager may attempt to solve a problem by looking for a cause of the problem.

At least a portion of the statistics information may be displayed in a form of a comparison between information associated with the reference server 120 and information associated with the development server 130. For example, the CPU performance-related information 330 may be displayed in a form of comparing results of comparisons between CPU performance of the reference server 120 and CPU performance of the development server 130, which may similarly or identically apply to cases of the memory performance-related information 340, the system load information 350, the available disk capacity information 360, and the information 370 associated with data throughput of the network per unit time. Also, a latency 320 shown in the drawing corresponds to latency information for each API of the electronic apparatus 110. In some cases, the latency 320 may correspond to information displayed by comparing latencies related to generating responses of the reference server 120 and the development server 130.

By displaying the statistics information that compares the information associated with the reference server 120 and the information associated with the development server 130, the manager may determine whether the changed code used by the development server 130 is erroneous. For example, as a result of identifying the performance information 320 through 370, when overall performance of the development server 130 is less than overall performance of the reference server 120 by a predetermined percentage or more, the manager may determine that the changed code used by the development server 130 is erroneous. In this case, the manager may attempt to solve the degradation in performance by looking for a cause of the degradation.

Figure 4:
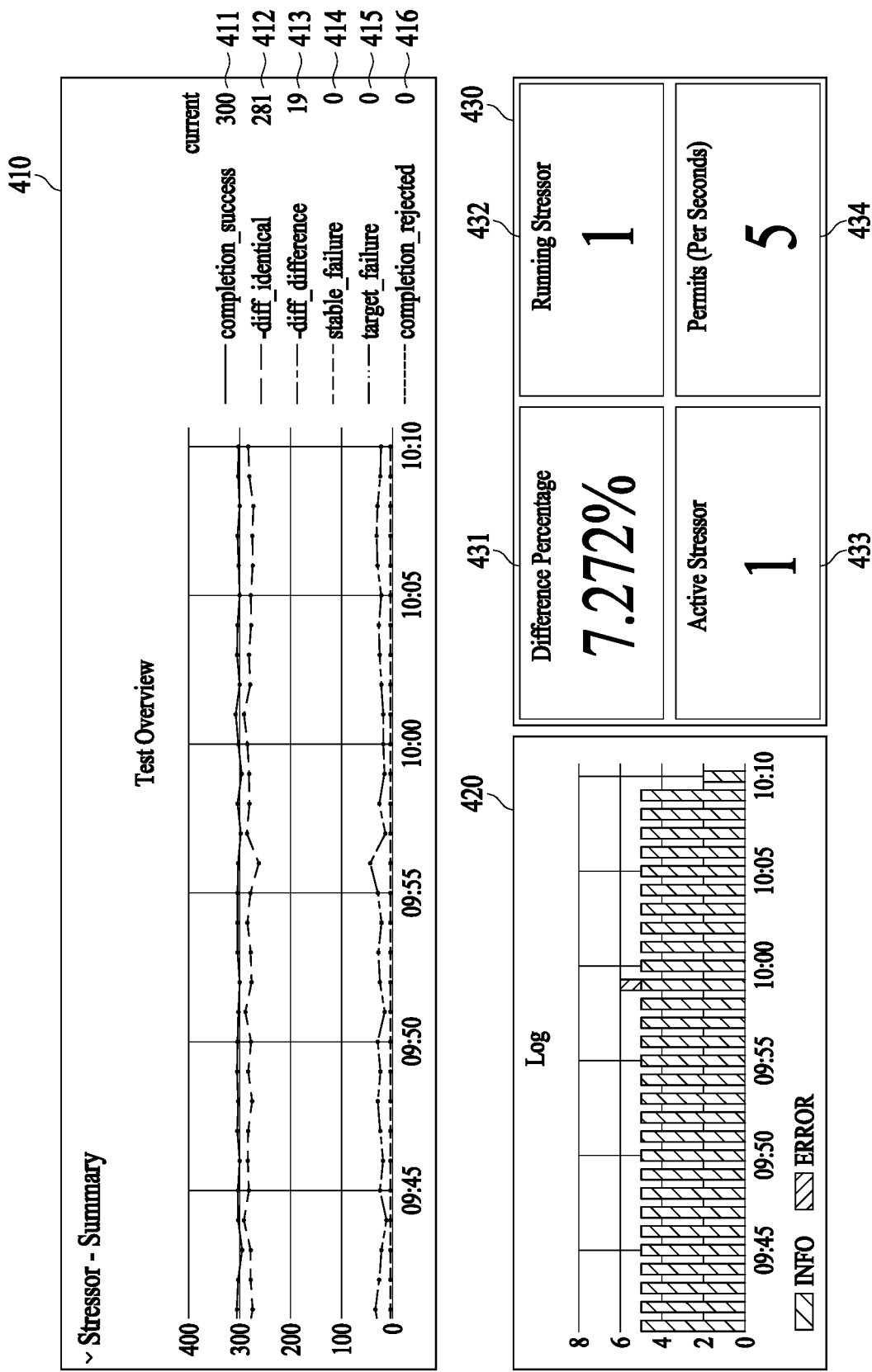
FIG. 4 is a diagram illustrating comparison information provided by an electronic apparatus according to an example embodiment.

FIG. 4 is a diagram illustrating comparison information provided by an electronic apparatus according to an example embodiment.

Referring to FIG. 4, the electronic apparatus 110 may provide comparison information 410 of a first response set and a second response set. The comparison information 410 may be displayed in a form of a graph having a time series as a horizontal axis. The comparison information 410 may be displayed to be separated for each of one or more APIs. By time-sequentially displaying the comparison information 410, a manager may identify how many nonmatching responses are received at what point in time.

The comparison information 410 provided by the electronic apparatus 110 may include a number 411 of responses successfully collected in association with a plurality of responses included in the first response set and a plurality of responses included in the second response set. In this case, the number 411 of the successfully collected responses may be counted by one when a specific response included in the first response set and a response that is included in the second response set and corresponds to the specific response included in the first response set are received successfully. For example, when the first response set includes 300 responses, the second response set includes 300 responses, and the responses included in the first response set fully correspond to the responses included in the second response set, the number 411 of successfully collected responses may be 300.

In addition, the comparison information 410 provided by the electronic apparatus 110 may include a number 412 of matching responses and a number 413 of nonmatching responses in terms of the plurality of responses included in the first response set and the plurality of responses included in the second response set. When an unexpected nonmatching response is found, the manager may determine that the changed code is erroneous and correct the changed code.

According to an example embodiment, the comparison information 410 provided by the electronic apparatus 110 may further include, for example, a number 416 of responses failed to be collected, a number 414 of failures occurring when transmitting and receiving information to and from the reference server 120 due to unstable communication, and a number 415 of failures occurring when transmitting and receiving information to and from the development server 130.

According to an example embodiment, the electronic apparatus 110 may provide log information 420. The log information 420 may be information recoded when an event satisfying a predetermined condition occurs. For example, the log information 420 may include an info log collected at preset time intervals and an error log collected when an error occurs. The log information 420 may be information generated in the electronic apparatus 110 or information received from the reference server 120 or the development server 130. The error log may be related to an operation error of the electronic apparatus 110 or related to an operation error of the reference server 120 or the development server 130.

According to an example embodiment, the electronic apparatus 110 may further provide information such as a nonmatching response occurrence ratio 431, a number 432 of sub-apparatuses currently driven among sub-apparatuses included in the electronic apparatus 110, a number 433 of sub-apparatuses activated among the sub-apparatuses included in the electronic apparatus 110, and an information transmission and reception count 434. A sub-apparatus is a device included in the electronic apparatus 110 and may be a device that performs an operation of providing comparison information of the first response set and the second response set. A currently driven sub-apparatus may correspond to a device that is providing comparison information in real time. An activated sub-apparatus may correspond to a device capable of providing the comparison information (that is, may include the currently driven sub-apparatus). The information transmission and reception count 434 may correspond to how many times the acquisition of the request information set, the transmission of the request information sub-set, or the reception of the first response set and the second response set is performed per unit time. Meanwhile, in the example embodiment, the electronic apparatus 110 may adjust the number of sub-apparatuses driven based on a setting.

Although not shown, the electronic apparatus 110 according to an example embodiment may provide information on or regarding the number of nonmatching responses to each of one or more APIs associated with the processing of the request information sub-set. Also, when a nonmatching response is generated, the electronic apparatus 110 according to an example embodiment may provide path information corresponding to the nonmatching response.

In addition, although not shown, the electronic apparatus 110 according to an example embodiment may provide various information including, for example, a usage of a heap area of a memory, a usage of a non-heap area of the memory, a runtime of a background thread running for memory management, the number of requests according to an http response, the number of threads, and a mean value of latency.

The usage of the heap area of the memory may be associated with whether a memory leakage occurs. Specifically, if the usage of the heap area is not maintained and increases right-upward over time, it can be predicted that the memory leakage occurs.

The runtime of the background thread running for memory management may include a garbage collector.

Figure 5:
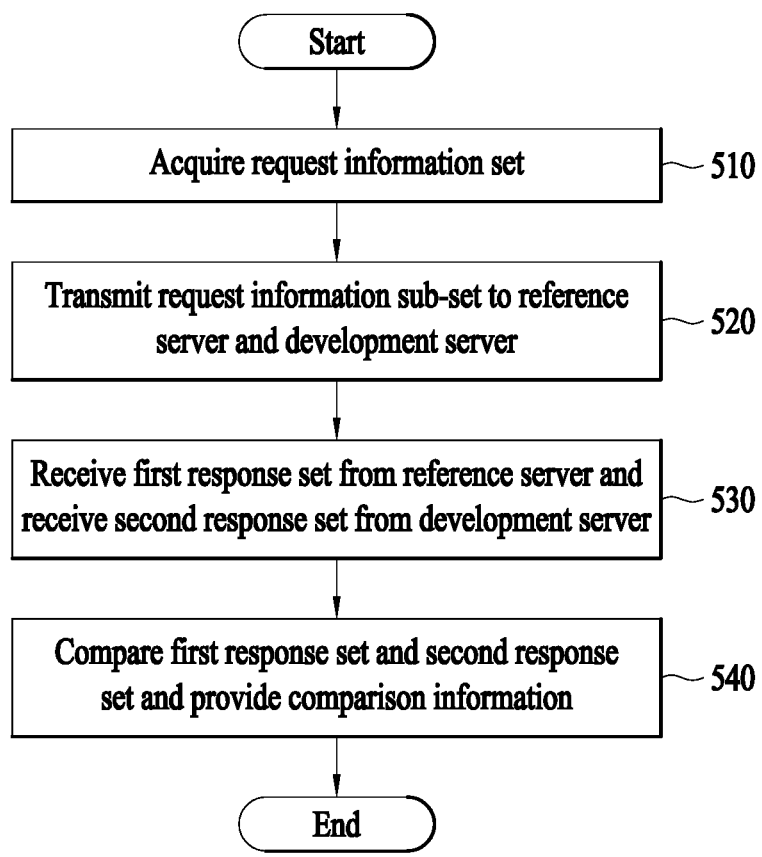
FIG. 5 is a flowchart illustrating an information providing method of an electronic apparatus according to an example embodiment.

FIG. 5 is a flowchart illustrating operations of an information providing method of an electronic apparatus according to an example embodiment.

Referring to FIG. 5, the electronic apparatus 110 according to an example embodiment acquires a request information set in operation 510 and transmits a request information sub-set corresponding to at least a portion of the request information set to the reference server 120 and the development server 130 in operation 520. In operation 530, the electronic apparatus 110 receives a first response set including a response to the request information sub-set from the reference server 120 and receives a second response set including a response to the request information sub-set from the development server 130.

In response to the first response set and the second response set being received, in operation 540, the electronic apparatus 110 compares the first response set and the second response set and provides comparison information.

Figure 6:
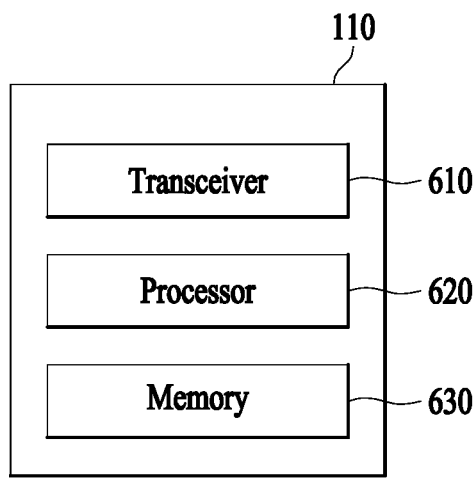
FIG. 6 is a diagram illustrating an example of a configuration of an electronic apparatus for verifying a code according to an example embodiment.

FIG. 6 is a diagram illustrating a configuration of an electronic apparatus for verifying a code according to an example embodiment.

Referring to FIG. 6, the electronic apparatus 110 includes a transceiver 610, a processor 620, and a memory 630. Through the transceiver 610, the electronic apparatus 110 may be connected to the reference server 120, the development server 130, and an external device (for example, a personal computer) to perform data exchange.

The processor 620 may include one or more apparatuses described with reference to FIGS. 1 through 5 or perform at least one of the methods described with reference to FIGS. 1 through 5. The memory 630 may store information (including the request information set, request information sub-set, the first response set, the second response set, the statistics information, and the comparison information described above) for performing at least one of the methods described with reference to FIGS. 1 through 5. The memory 630 may be a volatile memory or a non-volatile memory.

The processor 620 may execute a program and control the electronic apparatus 110 for providing information. A code of the program executed by the processor 620 may be stored in the memory 630.

In addition, the electronic apparatus 110 of the example embodiment may further include an interface for providing information to a manager.

The present specification and drawings have been described with respect to the example embodiments of the present disclosure. Although specific terms are used, it is only used in a general sense to easily explain the technical content of the present disclosure and to help the understanding of the invention, and is not intended to limit the scope of the specification. It will be apparent to those skilled in the art that other modifications based on the technical spirit of the present disclosure may be implemented in addition to the embodiments disclosed herein.

The electronic apparatus or terminal in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims.

What is claimed is:

1. A method of providing information in an electronic apparatus, the method comprising:
   acquiring a request information set from a service server, the request information set comprising a plurality of user information;
   sampling the plurality of user information based on a predetermined sampling proportion to identify a request information sub-set corresponding to at least a portion of the request information set;
   transmitting the request information sub-set to a reference server associated with the service server;
   transmitting the request information sub-set to a development server;
   receiving a first response set comprising a first response to the request information sub-set from the reference server, wherein a first code causes the reference server to generate the first response set in response to the request information sub-set, and wherein the first code corresponds to a code utilized by the service server;
   receiving a second response set comprising a second response to the request information sub-set from the development server, wherein a second code causes the development server to generate the second response set in response to the request information sub-set, and wherein the first code is modified to generate the second code based on a user input;
   generating comparison information based on comparing the first response set and a portion of the second response set, wherein the portion of the second response set corresponds to a part which excludes at least one response that is intended to be changed by the second code;
   determining, based on the comparison information, whether the second code is abnormal or normal based on determining whether a nonmatching response occurrence ratio between the first response set and the second response set exceeds a predetermined nonzero threshold ratio;
   deploying, based on determining the second code is normal, the second code to the service server; and
   causing display, via a display of the electronic apparatus, of information indicative of the second code based on determining the second code is normal.

2. The method of claim 1, wherein the plurality of user information is input to the service server.

3. The method of claim 1, wherein a structure of the development server corresponds to a structure of the reference server,
   wherein the second code is associated with the first code, and
   wherein the second code is changed based on an additional user input.

4. The method of claim 1, wherein the generating of the comparison information comprises:
   generating information associated with a comparison between the first response set and the portion of the second response set for each of one or more application programming interfaces (APIs) associated with processing of the request information sub-set.

5. The method of claim 1, wherein the acquiring of the request information set is on a time-by-time basis, wherein the generating of the comparison information comprises outputting time information associated with a result of comparison between the first response set and the portion of the second response set.

6. The method of claim 1, further comprising:
   outputting statistics information associated with the development server and the reference server.

7. The method of claim 6, wherein the statistics information comprises performance information associated with one or more of generating the first response to the request information sub-set by the reference server or generating the second response to the request information sub-set by the development server.

8. The method of claim 7, wherein the performance information comprises performance information of an application installed on one or more of the reference server or the development server, and
   wherein the performance information of the application comprises at least one of a memory usage and a latency related to generating one or more of the first response or the second response.

9. The method of claim 6, wherein the statistics information is output for each of one or more APIs associated with processing the request information sub-set.

10. The method of claim 1, wherein the electronic apparatus comprises at least one sub-apparatus, and
    wherein the generating of the comparison information is performed by the at least one sub-apparatus.

11. A non-transitory computer readable recording medium comprising a computer program for performing the method of claim 1.

12. The method of claim 1, wherein the generating of the comparison information comprises comparing performance of the reference server and performance of the development server, the method further comprising:
    providing statistics information based on comparing the performance of the reference server and the performance of the development server.

13. The method of claim 12, wherein the statistics information comprises one or more user inputs from the plurality of user information.

14. The method of claim 12, further comprising causing display, via the display of the electronic apparatus, of a comparison of the performance of the reference server and the performance of the development server.

15. The method of claim 1, further comprising:
    adjusting the predetermined sampling proportion; and
    performing a load test of the development server based on adjusting the predetermined sampling proportion.

16. The method of claim 1, wherein the comparison information comprises a comparison of performance of the reference server and performance of the development server over a period of time.

17. The method of claim 16, further comprising causing display, via the display of the electronic apparatus, of the comparison information via a graphical element, wherein the graphical element displays the comparison information over the period of time.

18. An electronic apparatus for providing information, the electronic apparatus comprising:
    a transceiver;
    a memory comprising instructions; and
    a processor, wherein the processor is connected to the memory to:
  acquire a request information set from a service server, the request information set comprising a plurality of user information;
  sample the plurality of user information based on a predetermined sampling proportion to identify a request information sub-set corresponding to at least a portion of the request information set;
  transmit the request information sub-set corresponding to at least a portion of the request information set to a reference server associated with the service server;
  transmit the request information sub-set to a development server;
  receive a first response set comprising a first response to the request information sub-set from the reference server, wherein a first code causes the reference server to generate the first response set in response to the request information sub-set, and wherein the first code corresponds to a code utilized by the service server;
  receive a second response set comprising a second response to the request information sub-set from the development server, wherein a second code causes the development server to generate the second response set in response to the request information sub-set, and wherein the first code is modified to generate the second code based on a user input;
  generate comparison information based on comparing the first response set and a portion of the second response set, wherein the portion of the second response set corresponds to a part which excludes at least one response that is intended to be changed by the second code;
  determine, based on the comparison information, the second code is abnormal or normal based on determining whether a nonmatching response occurrence ratio between the first response set and the second response set exceeds a predetermined nonzero threshold ratio, wherein the second code is configured to be deployed to the service server based on determining the second code is normal; and
  cause display, via a display of the electronic apparatus, of information indicative of the second code based on determining the second code is normal.

* * * * *